United States Patent [19]
Kawabe et al.

[11] Patent Number: 5,394,434
[45] Date of Patent: Feb. 28, 1995

[54] CODE-DIVISION MULTIPLE-ACCESS DEMODULATOR WITH IMPROVED INTERFERENCE CANCELATION

[75] Inventors: Manabu Kawabe; Takuro Sato; Toshio Kato; Akiyoshi Kawahashi; Atsushi Fukasawa, all of Tokyo, Japan

[73] Assignee: Oki Electric Industry Co., Ltd., Tokyo, Japan

[21] Appl. No.: 141,665

[22] Filed: Oct. 26, 1993

[30] Foreign Application Priority Data

Jan. 11, 1993 [JP] Japan ................................. 5-002660

[51] Int. Cl.⁶ .............................................. H04K 1/00
[52] U.S. Cl. ........................................ 375/205; 380/34
[58] Field of Search ............................... 375/1; 380/34

[56] References Cited

U.S. PATENT DOCUMENTS

| | | | |
|---|---|---|---|
| 4,528,674 | 7/1985 | Sweeney et al. | 375/1 |
| 5,151,919 | 9/1992 | Dent | 375/1 |
| 5,218,619 | 6/1993 | Dent | 375/1 |

OTHER PUBLICATIONS

Sklar, "Digital Communications, Fundamentals and Applications", Prentice Hall, 1988, pp. 571-573.
Yoon et al, "A Spread-Spectrum Multi-Access System with a Cascade of Co-Channel Interference Cancellers for Multipath Fading Channels", IEEE 2nd International Symposium on Spread Spectrum Techniques and Applications, 1992, pp. 87-90.

Primary Examiner—Tod R. Swann
Attorney, Agent, or Firm—Law Office of Steven M. Rabin

[57] ABSTRACT

A demodulator for code-division multiple-access spread-spectrum communications stores received chip data in a separate memory area for each transmitting station. Each area has a capacity of at least two symbols. When a complete symbol is received from a transmitting station, all chip data stored in the corresponding memory area are correlated with the corresponding spreading code, and estimated symbol values are derived from the correlated values. The correlated or estimated value of the oldest symbol is output as a demodulated value. The difference between each estimated symbol value and the previous estimate for the same symbol is multiplied by the spreading code to generate remaining interference values, which are subtracted from all chip data stored in memory areas for other transmitting stations, thereby updating those data.

13 Claims, 4 Drawing Sheets

CODE-DIVISION MULTIPLE-ACCESS DEMODULATOR WITH IMPROVED INTERFERENCE CANCELATION

BACKGROUND OF THE INVENTION

This invention relates to a spread-spectrum demodulator, more particularly to a demodulator for code-division multiple-access (CDMA) communications.

CDMA is employed in personal communication systems and other mobile communication systems in which M stations transmit simultaneously over the same frequency band. (M is an integer greater than one.) Each station uses a different pseudo-random noise signal as a spreading code, chopping each bit symbol of transmit data into smaller units, referred to as "chips," with pseudo-random values. A receiving station receives a signal equal to the sum of the M signals transmitted by the transmitting stations, and demodulates this received signal to M separate signals by, for example, multiplying the received signal by the M different spreading codes.

If the spreading codes are mutually orthogonal over each symbol duration and the mobile stations transmit in synchronization, the demodulated signals will be free of interference. In practice, however, the codes are not perfectly orthogonal, synchronization is lacking, and the signal transmitted by each mobile station interferes somewhat with the signals transmitted by other stations. As the number of stations increases, so does the amount of interference, until the desired signal from each station is swamped by noise. This interference, referred to as co-channel interference, becomes the factor limiting the number of stations that can access the system simultaneously.

SUMMARY OF THE INVENTION

It is accordingly an object of the present invention to reduce co-channel interference in CDMA spread-spectrum communications.

Another object of the invention is to increase the number of stations that can access a CDMA spread-spectrum communication system simultaneously.

In the invented demodulator, received chip data are stored in a memory having a separate memory area for each transmitting station. Each memory area holds data for a plurality of symbols. While residing in the memory, the data are updated as follows.

When the receiving station finishes receiving a symbol from one transmitting station, that transmitting station and the corresponding memory area are designated for processing. All data stored in the designated memory area are correlated with the spreading code of the designated transmitting station to generate correlated values for a plurality of symbols. Estimated symbol values are derived from these correlated values, and are stored temporarily.

The difference between each estimated symbol value and the previous estimate for the same symbol is multiplied by the spreading code of the designated station to generate remaining interference values. The remaining interference values are subtracted from all chip data stored in the memory, except for data stored in the designated memory area, thereby updating the memory contents. A demodulated value is output for the oldest symbol stored in the designated memory area.

DETAILED DESCRIPTION OF THE INVENTION

The invention will next be described with reference to the attached drawings. These drawings illustrate the invention but do not restrict its scope, which should be determined solely from the appended claims.

Figure 1:
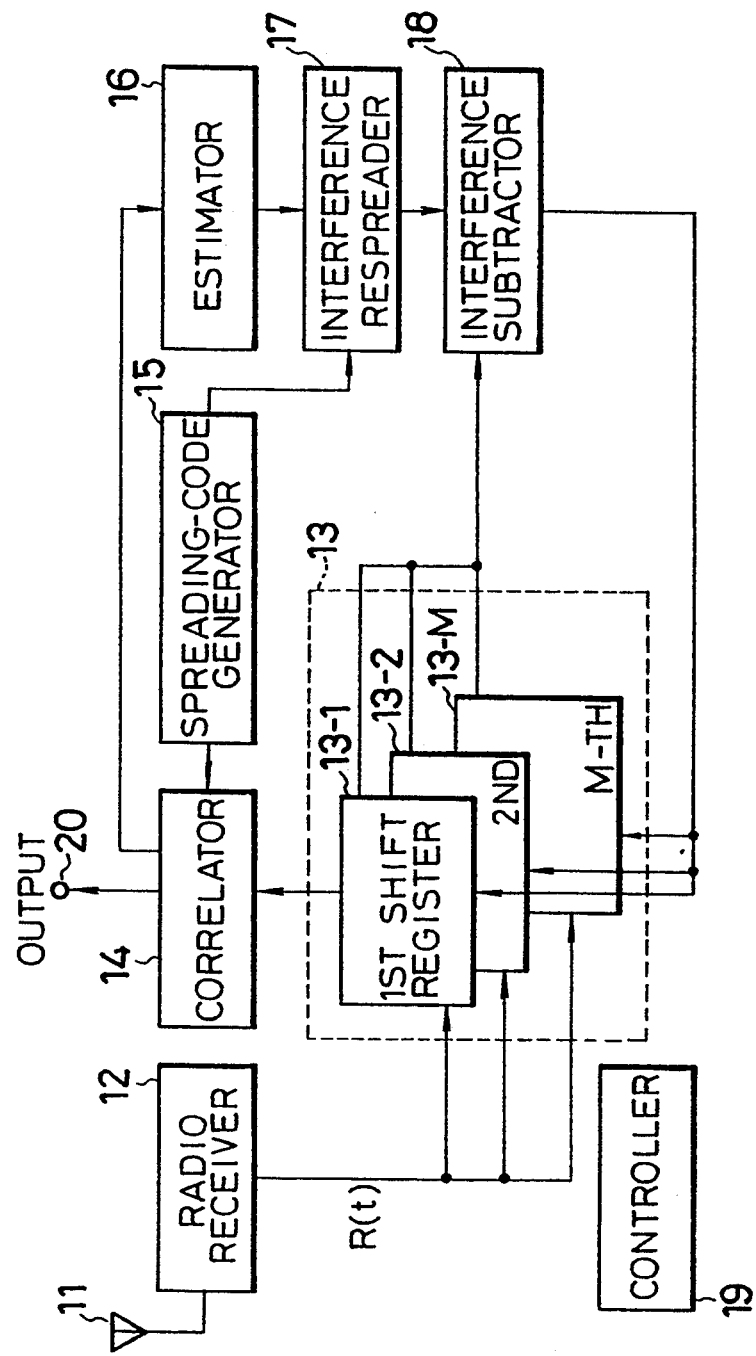
FIG. 1 is a block diagram illustrating the invented demodulator.

Referring to FIG. 1, the receiving station has an antenna 11 for receiving a radio-frequency signal, and a radio receiver 12 for amplifying the received signal and converting it to a baseband signal R(t). The baseband signal R(t) is fed to a demodulator comprising the rest of the elements in FIG. 1.

The demodulator has a memory 13 organized as a set of shift registers 13-1, ..., 13-M, where M is the number of transmitting stations. The received baseband signal R(t) is input separately to each of these shift registers a chip at a time, and shifted in each register toward the right in the drawing. Each shift register is long enough to accommodate data for K symbols, where K is a suitable integer greater than one.

Data from the shift registers are fed to a correlator 14, which correlates them with spreading codes generated by a spreading-code generator 15. Correlated data output from the correlator 14 are supplied to an estimator 16, which generates and temporarily stores estimated symbol values. A respreader 17 obtains pairs of current and previous estimated symbol values from the estimator 16 and multiplies their difference by a spreading code received from the spreading-code generator 15 to estimate remaining interference values. An interference subtractor 18 uses the estimated remaining interference values to update the contents of the memory 13. Demodulated values of the oldest symbols stored in the memory 13 are output from an output port coupled to the correlator 14.

The operations of the foregoing demodulator elements are coordinated and controlled by a controller 19, which detects symbol boundaries and designates the shift register to be processed by the other demodulator elements.

The demodulator elements in FIG. 1 are preferably implemented as one or more digital integrated circuits, such as standard memory and processor integrated circuits, or application-specific integrated circuits. Descriptions of the circuit configurations will be omitted to avoid obscuring the invention with needless detail.

Next the general principal of CDMA spread-spectrum communication will be briefly described.

The j-th transmitting station generates a baseband signal of the form $$a_j(t) \cdot PN_j(t)$$

where $a_j(t)$ is the transmit data signal, comprising symbols with values of plus or minus one, and $PN_j(t)$ is the spreading code, a pseudo-random signal that also takes on values of plus or minus one. The t-parameter denotes time measured in suitable units.

The frequency of $PN_j(t)$ is much higher than the frequency of $a_j(t)$. During the duration of one symbol, the value of $a_j(t)$ remains constant while $PN_j(t)$ changes in pseudo-random fashion. Multiplication by the spreading code $PN_j$ thus chops each symbol into chips, each chip again having a value of plus or minus one.

The above baseband signal modulates a carrier signal to create the actual signal transmitted by the j-th station. The radio receiver 12 in FIG. 1 demodulates the received signal to recover the baseband signal $R(t)$. If M stations are transmitting, then $R(t)$ has the form of a sum of M terms:

$$R(t) = a_1(t) \cdot PN_1(t) + a_2(t) \cdot PN_2(t) + \ldots + a_M(t) \cdot PN_M(t)$$

A symbol transmitted by the j-th station can be extracted from this sum by multiplying $R(t)$ by $PN_j(t)$ and averaging the results over the symbol interval, obtaining:

$$b_j = (1/N)\Sigma a_j(t) \cdot PN_j(t) \cdot PN_j(t) + + (1/N)\Sigma\Sigma a_i(t) \cdot PN_i(t) \cdot PN_j(t)$$

N is the number of chips per symbol. Summation in the first term on the right (the desired data term) is over N consecutive values of t. Since $PN_j(t) \cdot PN_j(t) = 1$, the first term has a value equal to $a_j(t)$, which is constant in this interval of N values of t.

Summation over the second term on the right (the co-channel interference term) is over the same N values of t and over the M−1 values of i excluding i=j. When i≠j, the products $a_i(t) \cdot PN_i(t) \cdot PN_j(t)$ will be plus and minus one with equal probability, so if N is large, the average value of N of those products will be close to zero, and if M is not too large, the sum of M−1 of these average values will also be close to zero.

Given the imperfect orthogonality of the spreading codes and lack of synchronization between transmitting stations, however, there is a certain probability that the co-channel interference term will exceed the desired data term in magnitude and be opposite in sign, causing a symbol error. As M increases, so does this probability, and the error rate rises.

Next the operation of the invented demodulator will be described, with reference to FIG. 1 and the flowchart in FIG. 2.

Figure 2:
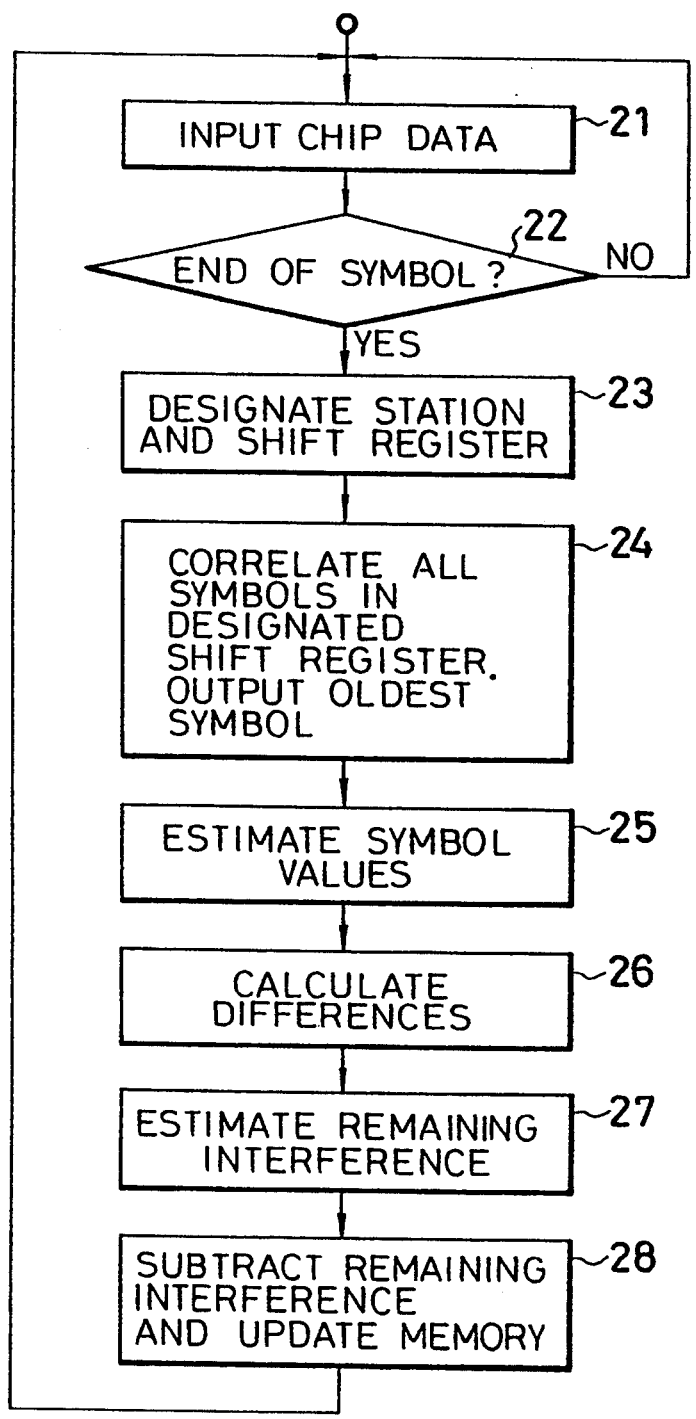
FIG. 2 is a flowchart illustrating the invented demodulation method.

Omitted from FIG. 2 are well-known steps by which the controller 19 recognizes each transmitting station and establishes communication with it. As a result of these steps, the spreading-code generator 15 is able to generate the spreading code employed by each transmitting station, and the controller 19 is able to identify boundaries between the symbols transmitted by each station.

In the first step 21 in FIG. 2, the received baseband signal $R(t)$ output from the radio receiver 12 is sampled at the chip rate, and identical sampled values are input into all the receive shift registers 13-1, ..., 13-M. In the next step 22 the controller 19 waits until it recognizes that some transmitting station has reached the end of a transmitted symbol.

When the controller 19 recognizes the end of a transmitted symbol, it designates the station that transmitted that symbol, and designates the corresponding shift register (step 22). If the i-th station and shift register 13-i are designated, the entire contents of shift register 13-i, comprising data for K complete symbols, are transferred from the memory 13 to the correlator 14.

If two stations i and j reach symbol boundaries simultaneously, they are designated in turn according to a fixed rule, such as lowest-numbered station first. If all symbols have the same length (as is usual), the stations are designated in a regular cyclic order.

In the next step 24, the correlator 14 correlates the data received from shift register 13-i with the designated station's spreading code $PN_i(t)$, which it receives from the spreading-code generator 15. If $D_i(t)$ represents the data stored in shift register 13-i, for each symbol, the correlator 14 performs the following calculation:

$$b_i(k) = (1/N)\Sigma D_i(t) \cdot PN_i(t)$$

The summation range is over the N consecutive values of t belonging to one symbol. The parameter k denotes the symbol position in the shift register. Since the shift register holds data for K symbols, k is, for example, an integer from one to K.

The correlated value $b_i(K)$ of the oldest symbol in the shift register is output from the output port 20 as a demodulated symbol value of the designated i-th station. All of the correlated values $b_i(k)$ (k=1, ..., K) are output to the estimator 16.

The estimator 16 estimates the value $c_i(k)$ of each symbol from its correlated value $b_i(k)$. Rather than making a hard decision, the estimator 16 makes a soft estimate; that is, instead of setting $c_i(k)$ equal to plus or minus one, it moves $c_i(k)$ to a value intermediate between $b_i(k)$ and plus or minus one. A soft estimate can be obtained by using the square-root function as follows:

$$c_i(k) = \text{sign}(b_i(k)) \cdot \text{sqrt}(|b_i(k)|)$$

Here, | | denotes absolute value, sqrt() denotes the square root, and sign() expresses the plus or minus sign. The advantage of a soft estimate is that it avoids overcommitting the estimator 16 in doubtful cases. If $b_i(k)$ is close to zero, indicating an uncertain symbol value, then $c_i(k)$ will be fairly close to zero too.

The estimator 16 retains a copy of the estimates it made for the same symbols the previous time the i-th station was designated, and outputs to the respreader 17 both its current estimates $c_i(k)$ and these previous estimates $g_i(k)$. For the first symbol (k=1) in the shift register, there was no previous estimate, so $g_i(1)$ is zero.

The invention can be practiced with a different soft-estimation function, or indeed without any function at all: the correlated values $b_i(k)$ can be used directly as the symbol estimates $c_i(k)$. In that case the estimator 16 simply stores the current and previous correlated values.

The respreader 17 calculates, for each symbol, the difference $f_i(k)$ between the current and previous estimates of that symbol (step 26):

$$f_i(k) = c_i(k) - g_i(k)$$

Next the respreader 17 multiplies the difference $f_i(k)$ by the spreading code $PN_i(t)$ of the designated i-th station, which it receives from the spreading-code generator 15, to obtain the following $E_i(t)$ (step 27):

$$E_i(t) = f_i(k) \cdot PN_i(t) = c_i(k) \cdot PN_i(t) - g_i(k) \cdot PN_i(t)$$

The parameters t and k are related in the obvious way, k remaining constant as t ranges over one symbol interval. The $c_i(k) \cdot PN_i(t)$ values comprise the current estimate of the actual signal $a_i(k) \cdot PN_i(t)$ that was transmitted by the designated i-th station, and the $g_i(k) \cdot PN_i(t)$ values are the previous estimate of this transmitted signal. As discussed in the next step, the signals estimated to have been transmitted by the designated station are removed as interference from the data for other stations. Accordingly, $E_i(t)$ is the estimated remaining interference that has not been removed yet.

In the next step 28 in FIG. 2, the interference subtractor 18 updates the shift-register contents for all stations other than the designated station by subtracting the estimated remaining interference values $E_i(t)$. For each other station j (j≠i), it reads all the data $D_j(t)$ from corresponding shift register 13-j, subtracts $E_i(t)$, and writes the result back into shift register 13-j, thus performing the following operation:

$$D_j(t) \leftarrow D_j(t) - E_i(t)$$

Figure 3:
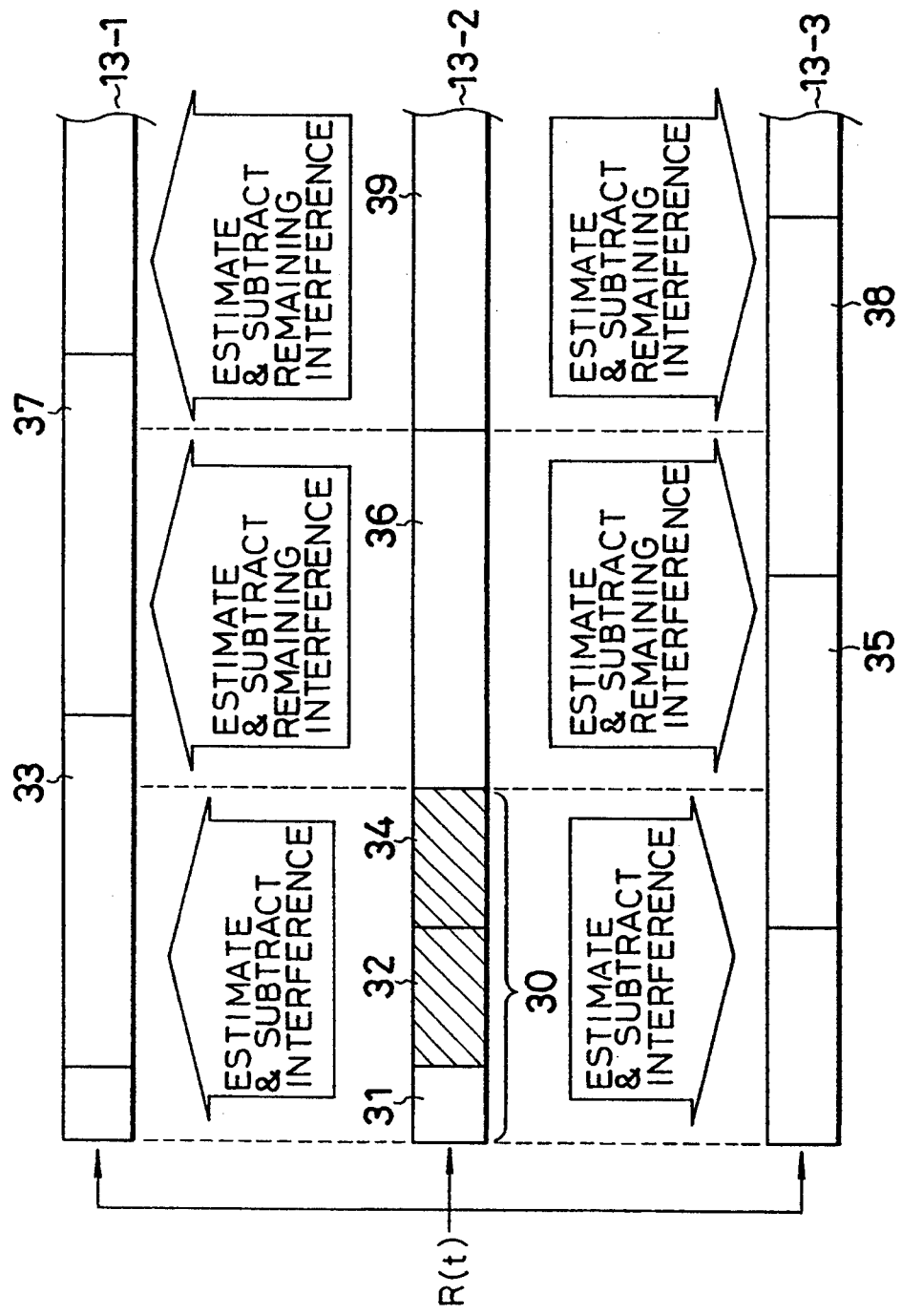
FIG. 3 is a diagram illustrating the removal of interference.

FIG. 3 illustrates these operations diagrammatically, showing three shift registers 13-1, 13-2, and 13-3. The heavy vertical lines in the shift registers indicate symbol boundaries. It will be assumed that only three stations are currently transmitting. At the instant shown, a new complete symbol 30 has just been received from the second station, as indicated in the second shift register 13-2. The second station is accordingly the designated station.

The data for this symbol 30 comprise three parts. The first part 31 is the received raw chip data R(t), which have not yet been updated by subtraction of interference from any other station. The second part 32 has already been updated by subtracting estimated interference from a symbol 33 which was received a short time ago from the first station. The third part 34 has been updated by subtracting estimated interference from both this symbol 33 and another symbol 35 which was received somewhat further ago from the third station.

The estimated value $c_2(1)$ of this symbol 30 is therefore based on data from which interference has already been partly removed. The estimated interference $c_2(1) \cdot PN_2(t)$ caused by symbol 30 is calculated and subtracted from the corresponding segments of the data in the first and third shift registers 13-1 and 13-3. These segments need not and generally will not correspond to symbol boundaries in those shift registers.

The next symbol 36 in the second shift register 13-2 has already been updated to remove estimated interference from symbols 33 and 37 in the first shift register 13-1 and symbols 35 and 38 in the third shift register 13-3. The interference caused by this symbol 36 is now estimated to be $c_2(2) \cdot PN_2(t)$, but since a previous (less accurate) estimate $g_2(2) \cdot PN_2(t)$ was already subtracted from the first and third shift registers 13-1 and 13-3 one cycle ago (when the symbol 36 was in the first position in the shift register 13-2), this time the difference $c_2(2) \cdot PN_2(t) - g_2(2) \cdot PN_2(t)$ is subtracted as remaining interference. A similar procedure is followed with the third symbol 39 and subsequent symbols in the shift register 13-2.

It is a significant feature of the present invention that the very first correlation and estimate of a symbol value, and of interference caused by that symbol, are based on data that have already been partially purged of interference from other stations. Moreover, each time an interference estimate is made, the estimated interference is immediately removed from all relevant data in the shift registers, thereby improving all subsequent correlations and estimates for all stations. Every correlation and estimate of a signal or interference value is made with the best data available at the time. As a result, the symbol estimates are able to converge quickly to the true symbol values, and convergence is highly stable.

During the interval from when a particular station is designated until the next time the same station is designated again, each of the other M−1 stations will be designated once. Each symbol spends K of these intervals in the memory 13. Accordingly, by the time a symbol reaches the end of a shift register, it has been updated (M−1)·K times, each update tending to be more accurate than the last. When the demodulated values are finally output, the error rate is correspondingly low.

Figure 4:
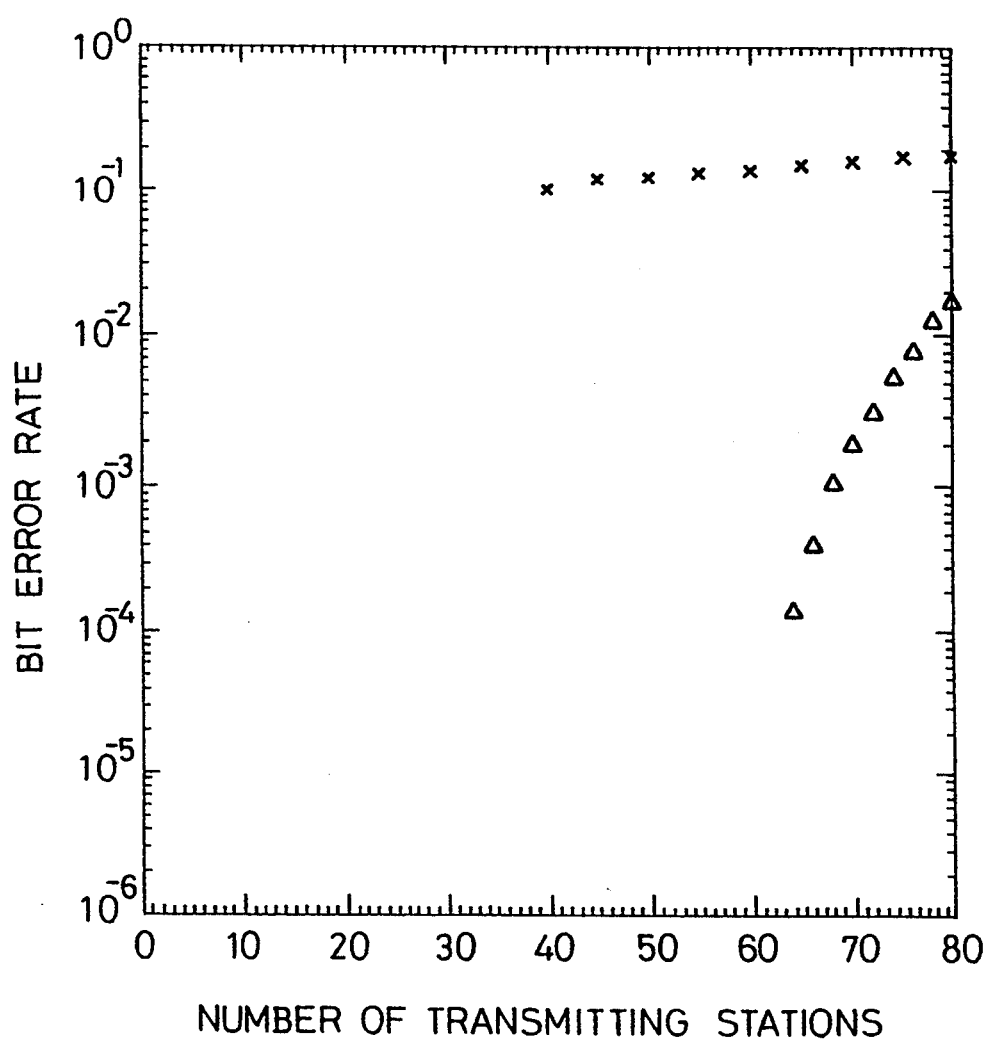
FIG. 4 is a graph illustrating simulated bit-error rates.

FIG. 4 shows the result of a computer simulation of the performance of the invented demodulator and a conventional demodulator that only correlates the received signal with the spreading codes. Noise other than co-channel interference was excluded. The number of transmitting stations is indicated on the horizontal axis. The symbol error rate (bit error rate) is indicated on the vertical axis. The points marked with triangles represent the invented demodulator; the points marked with crosses represent the conventional demodulator. Pseudo-random spreading codes with a cycle length of $2_{42}-1$ were used. The transmit data were pseudo-random data with a cycle length of $2_9-1$ (511). There were sixty-four chips per symbol, and the shift registers in the invented demodulator were ten symbols (six hundred forty chips) long. It is clear that the invented demodulator far outperforms the conventional demodulator, permitting access by many more transmitting stations.

The invented demodulator can be modified in various ways. Instead of the correlated value $b_i(K)$, the estimated value $c_i(K)$ can be output as demodulated data for the i-th station. The output port 20 will then be coupled to the estimator 16. The estimator 16 can make hard decisions instead of soft estimates for some or all of the symbols. Ring buffers, random-access memory, or other memory configurations can be employed instead of shift registers. Instead of feeding identical received data into the memory areas for all stations, it is possible to use the spreading codes when the received signal is converted to the baseband, so that the memory receives data that have already been correlated once, though not yet cleared of interference.

Those skilled in the art will recognize that still further modifications can be made without departing from the scope of the invention as claimed below.

What is claimed is:

1. A demodulator for code-division multiple-access spread-spectrum communications, comprising:
    a memory (13) divided into separate memory areas for different transmitting stations, each memory area storing received chip data and updated chip data for a plurality of symbols including at least a newest symbol and an oldest symbol;
    a spreading-code generator (15) for generating spreading codes used by respective transmitting stations;
    a correlator (16) coupled to correlate all data in a designated memory area among said memory areas with a corresponding spreading code generated by said spreading-code generator (15), thereby generating correlated values for a plurality of symbols;

an estimator (16) coupled to receive said correlated values, calculate therefrom a plurality of estimated symbol values, and temporarily store said estimated symbol values;

a respreader (17) coupled to calculate differences between said estimated symbol values and previously stored estimated symbol values, and multiply said differences by said corresponding spreading code to create remaining interference values;

an interference subtractor (18) coupled to update all data stored in said memory (13), except data stored in said designated memory area, by subtracting said remaining interference values;

a controller (19) for recognizing symbol boundaries and designating a memory area in said memory whenever its corresponding transmitting station completes transmission of a symbol; and an output port (20) coupled to output, for the oldest symbol stored in said designated memory area, a demodulated value that has at least been correlated by said correlator (14).

2. The demodulator of claim 1, wherein said estimated symbol values are soft estimates.

3. The demodulator of claim 1, wherein said estimator (16) employs a sign function to calculate said estimated symbol values.

4. The demodulator of claim 3, wherein said estimator (16) employs a square-root function to calculate said estimated symbol values.

5. The demodulator of claim 1, wherein identical received chip data are input to all said memory areas.

6. The demodulator of claim 1, wherein each of said areas in said memory (13) is organized as a shift register with a first stage and a last stage, received chip data being input into said first stage and shifted toward said last stage.

7. The demodulator of claim 1, wherein said output port (20) is coupled to said correlator (14) and outputs, as said demodulated value, a correlated value of said oldest symbol, as generated by said correlator.

8. A method of demodulating a code-division multiple-access spread-spectrum signal, comprising the steps of:

storing received chip data and updated chip data in a memory divided into separate memory areas, each memory area corresponding to a different transmitting station, and each memory area storing data for a plurality of symbols including at least a newest symbol and an oldest symbol;

designating a transmitting station and its corresponding memory area whenever said transmitting station finishes transmitting a symbol, thus obtaining a designated transmitting station and designated memory area;

correlating all data stored in the designated memory area with a spreading code employed by the designated transmitting station, thereby generating correlated values for a plurality of symbols;

estimating symbol values from said correlated values, thereby generating estimated symbol values;

storing said estimated symbol values temporarily, so that current estimated symbol values and previous estimated symbol values are available simultaneously;

calculating difference values between said current estimated symbol values and said previous estimated symbol values;

multiplying said difference values by the spreading code employed by said designated transmitting station, thereby generating remaining interference values;

updating all data stored in said memory, except data stored in said designated memory area, by subtracting said remaining interference values; and outputting a demodulated value for the oldest symbol stored in said designated memory area, said demodulated value having at least been correlated in said step of correlating all data.

9. The method of claim 8, wherein the step of estimating symbol values is carried out by making soft estimates.

10. The method of claim 9, wherein the step of estimating symbol values comprises the further steps of:

taking an absolute value of a correlated value;

taking a square root of said absolute value; and multiplying said square root by a sign of said correlated value.

11. The method of claim 8, comprising the further step of shifting data stored in each of said memory areas, thereby making room for new received chip data.

12. The method of claim 8, wherein said demodulated value is a correlated value generated in the step of correlating all data.

13. The method of claim 8, wherein said demodulated value is an estimated symbol value generated in the step of estimating symbol values.

* * * * *